(12) United States Patent
Jensen

(10) Patent No.: US 6,743,136 B1
(45) Date of Patent: Jun. 1, 2004

(54) DIFFERENTIAL CASE WITH LUBRICATION PASSAGES

(75) Inventor: William Glen Jensen, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/294,800

(22) Filed: Nov. 15, 2002

(51) Int. Cl.[7] ............................................. F16H 57/04
(52) U.S. Cl. ........................................ 475/160; 475/230
(58) Field of Search ................................ 475/160, 159, 475/230; 384/368

(56) References Cited

U.S. PATENT DOCUMENTS

| | | |
|---|---|---|
| 1,874,646 A | 8/1932 | Skinner |
| 1,913,842 A | 6/1933 | Manville |
| 3,762,503 A | 10/1973 | Wilder et al. |
| 4,084,450 A | 4/1978 | Conroy |
| 4,183,263 A | 1/1980 | Osenbaugh |
| 4,244,242 A * | 1/1981 | Uno et al. .................. 475/160 |
| 4,586,395 A | 5/1986 | Fukuchi et al. |
| 4,841,807 A | 6/1989 | Merkler |
| 5,540,300 A * | 7/1996 | Downs et al. ............. 184/11.2 |
| 5,624,343 A | 4/1997 | Krisher |
| 5,709,135 A * | 1/1998 | Baxter ......................... 74/607 |
| 5,989,143 A * | 11/1999 | Bell et al. .................... 475/160 |
| 6,053,835 A * | 4/2000 | Shibazaki et al. .......... 475/160 |

FOREIGN PATENT DOCUMENTS

JP 59023159 A * 2/1984 ........... F16H/57/04

* cited by examiner

Primary Examiner—Saul Rodriguez
Assistant Examiner—David D. Le
(74) Attorney, Agent, or Firm—Liniak, Berenato & White

(57) ABSTRACT

A differential assembly for a motor vehicle comprises a differential case rotatably supported in an axle housing and forming an inner cavity housing a differential gear mechanism. The differential gear mechanism includes at least one pinion mate gear rotatably supported by a pinion shaft extending through radial bores in the differential case. The pinion mate gear has a back face adapted to cooperate with a complementary pinion seat surface through a thrust washer disposed therebetween. The differential case further includes at least one lubrication passage formed within the differential case adjacent to the radial bore receiving the pinion shaft. The lubrication passage provides fluid communication path for the lubricating oil from an oil reservoir in an axle housing to a space between the pinion seat surface of the differential case and the thrust washer of the pinion mate gear.

12 Claims, 6 Drawing Sheets

DIFFERENTIAL CASE WITH LUBRICATION PASSAGES

BACKGROUND OF THE INVENTION

1. Field of the Invention

The present invention relates to differential assemblies and, more particularly, to a differential case provided with lubrication passages for lubrication and cooling of pinion gears and the differential assembly.

2. Description of the Prior Art

Conventionally, differential assemblies well known in the prior art, are arranged in a power transmission system of a motor vehicle to allow a pair of output shafts operatively coupled to an input axle shaft to rotate at different speeds, thereby allowing vehicle wheels associated with each output axle shaft to maintain traction with the road while the vehicle is turning. Such a device essentially distributes the torque provided by the input shaft between the output axle shafts.

The typical automotive differential assembly is driven through a pinion shaft that is secured to a differential case. A plurality of pinion mate gears are mounted on the pinion shaft for rotation thereon. A spherical thrust washer adjacent to the differential case receives load from the pinion mate gear when the pinion mate gear rotates. The pinion mate gear rotates when there are different speeds between the driving axles as when cornering or when one wheel is on ice and is called differential action. When there is no differential action, the pinion mate gears do not rotate. The pinion mate gears drive side gears which are connected to the output axle shafts for driving the vehicle. Generally, the differential assembly is driven by a pinion on a propeller shaft which engages a ring gear on the differential case. As the differential case is rotated, the side gears are also rotated which in turn drives the output axle shafts for driving the vehicle. Generally this design of the differential assembly operates satisfactorily. However, one of the drawbacks of this design is when the spider gear rotates on the spider shaft at extreme speeds, due to a lack of sufficient lubrication, the excessive friction between the differential case and the pinion mate gear causes excessive wear and heat generation of a differential mechanism and occasional failure of the differential assembly.

Accordingly, it is the intent of this invention to overcome these shortcomings of the prior art.

SUMMARY OF THE INVENTION

The present invention provides an improved differential assembly having a differential case provided with lubrication passages for lubrication and cooling of pinion mate gears and the differential assembly.

The differential assembly in accordance with the preferred embodiment of the present invention includes the differential case rotatably supported within an axle housing and forming an inner cavity housing a differential gear mechanism rotatably supported in the differential case. The differential gear mechanism includes at least one pinion mate gear rotatably supported by a pinion shaft. The pinion shaft is secured to the differential case by extending through radial bores in the differential case. The pinion mate gear has a back face adapted to cooperate with a complementary pinion seat surface through a thrust washer disposed therebetween.

In order to provide efficient lubrication of the pinion mate gear, at least one lubrication passage is formed within the differential case adjacent to the radial bore receiving the pinion shaft. The lubrication passage provides fluid communication path for the lubricating oil from an oil reservoir in an axle housing to a space between the pinion seat surface of the differential case and the thrust washer of the pinion mate gear. The lubrication passage includes at least one inlet port provided on an outer peripheral surface of the differential case and spaced from the radial bore, and an outlet port open into the space between the pinion seat surface and the pinion mate gear and spaced from the radial bore.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
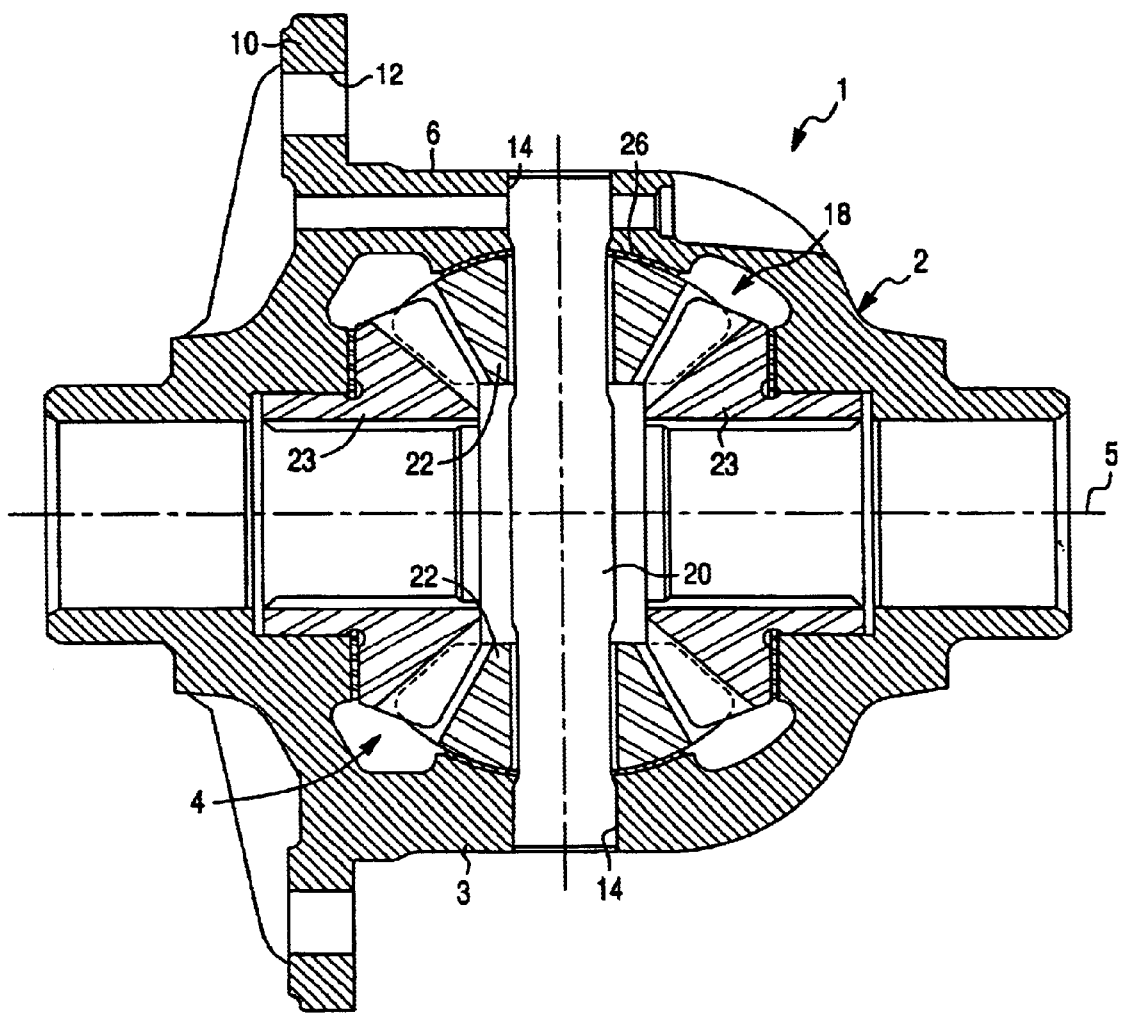
FIG. 1 is a sectional view of a differential assembly in accordance with the present invention.

FIG. 1 depicts a differential assembly 1 in accordance with the preferred embodiment of the present invention. The differential assembly 1 comprises a differential case 2 supported for rotation about a longitudinal axis 5 and driven by a drive pinion gear (not shown) transmitting a drive torque from an engine (not shown) through a propeller shaft (not shown).

Figure 2:
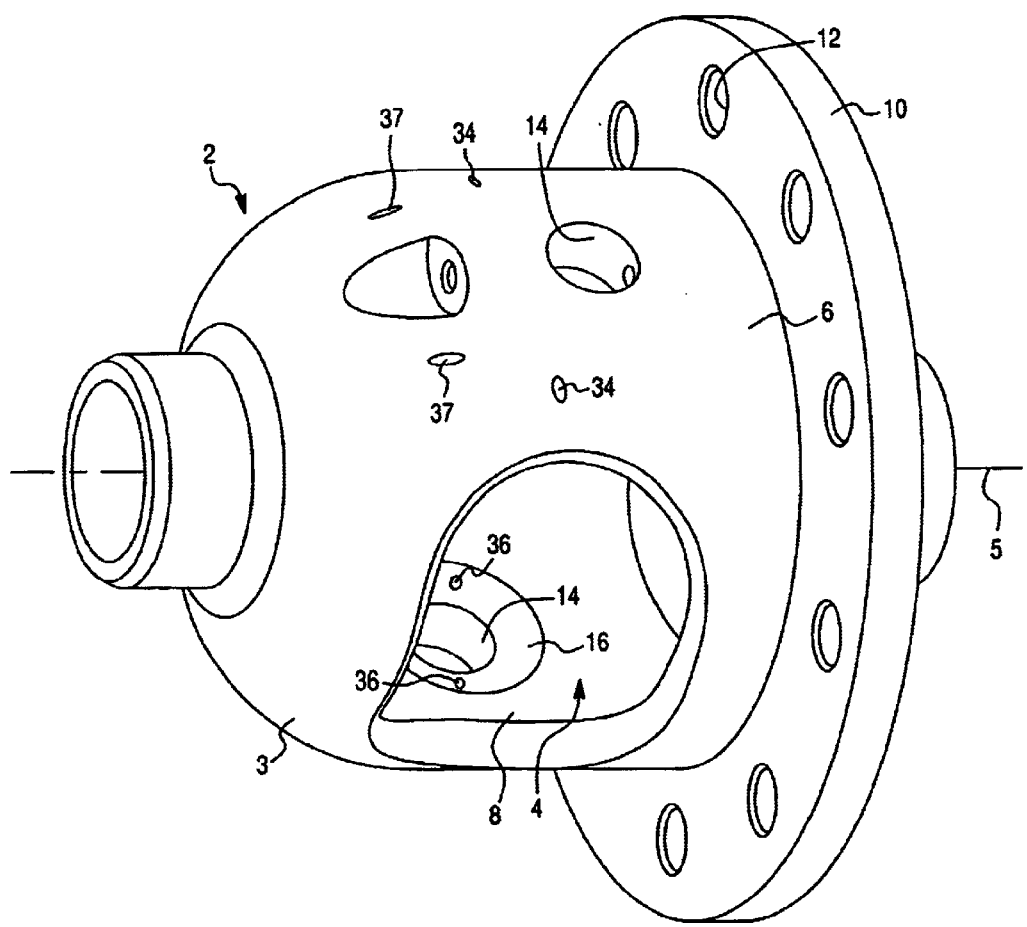
FIG. 2 is a perspective view of a differential case in accordance with the present invention.

The differential case 2, further illustrated in detail in FIG. 2, includes a hollow body 3 defining a inner cavity 4 provided for receiving a differential gear mechanism 18. The hollow body 3 of the differential case 2 has an outer peripheral surface 6 and an inner peripheral surface 8. The hollow body 3 of the differential case 2 is further provided with a flange 10 adapted for securing to a ring gear (not shown) thereto by any appropriate manner known to those skilled in the art. Preferably, the ring gear is affixed to the flange 10 through a bolt connection using a plurality of bolts (not shown) extending through corresponding bores 12 formed through the flange 10.

Figure 3:
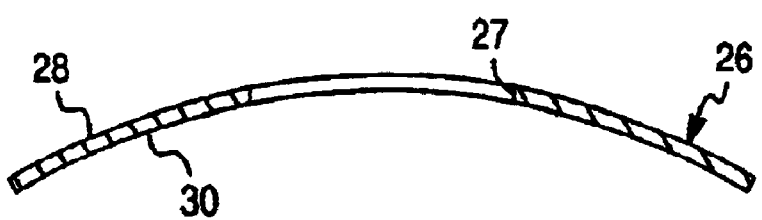
FIG. 3 is a cross-sectional view of a thrust washer of the present invention.

As further illustrated in FIG. 1, the differential gear mechanism 18 is disposed within the inner cavity 4 in the differential case 2. The differential gear mechanism 18 includes pinion mate gears 22 rotatably supported by a pinion shaft 20. Each of the pinion mate gears 22 conventionally meshes with differential side gears 23 respectively splined to inward ends of axle shafts (not shown). The pinion mate gears 22 provide differential action allowing differential rotation between the side gears 23 in certain driving conditions, such as when the vehicle is cornering. The pinion shaft 20 extend through radial bores 14 in the differential case 2. The pinion mate gears 22 have respective outboard spherical faces 24, as shown in FIG. 3, which are received in complementary spherical pinion seat surfaces 16 formed in the inner peripheral surface 8 of the differential case 2.

Figure 4:
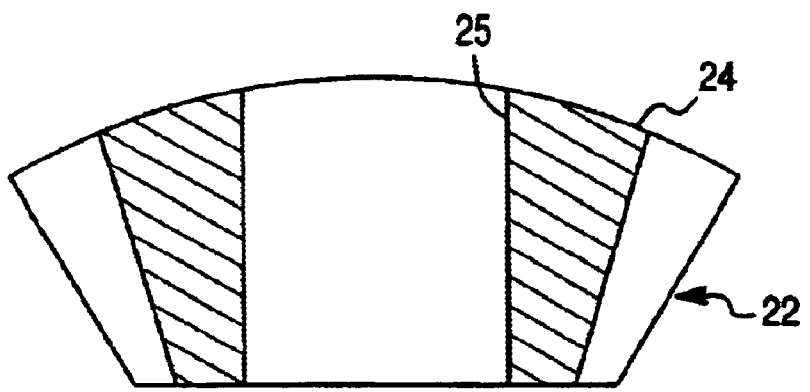
FIG. 4 is a cross-sectional view of a pinion mate gear of the present invention.

During the operation of the differential assembly 1, substantial thrust loads may be imposed on the pinion mate gears 22. Accordingly, as illustrated in FIGS. 1 and 3, thrust washers 26 are mounted to the pinion shaft 20 between the outboard spherical faces 24 of the pinion mate gears 22 and the respective spherical pinion seat surfaces 16 in the differential case 2. As illustrated in detail in FIG. 4, each of the thrust washers 26 is semi-spherically shaped and has an outboard surface 28 complementary to the spherical pinion seat surface 16 in the differential case 2, and an inboard surface 30 complementary to the outboard spherical face 24 of the pinion mate gear 22. A central opening 27 is formed through the thrust washer 26 for mounting on the pinion shaft 20.

It will be appreciated by those skilled in the art that while preferably the mating surfaces of the differential case pinion seat surface 16, the pinion mate gear 22 and the thrust washer 26 are spherical, any other appropriate mating surfaces, such as conical surfaces or flat annular surfaces, are within the scope of the present invention.

An internal bore 25 formed through each of the pinion mate gears 22 and the central opening 27 formed through each of the thrust washers 26 are each slightly larger than an outside diameter of the pinion shaft 20 to permit the pinion gears 22 and thrust washers 26 to move axially thereon.

At least one lubrication passage 32 is formed within the body 3 of the differential case 2 adjacent to the radial bores 14 therein in order to establish communication between the inner cavity 4 within the differential case 2 between the pinion seat surface 16 and the thrust washer 26 and a central cavity in an axle housing (not shown) containing an oil reservoir. Preferably, the lubrication passage 32 is in the form of the substantially cylindrical passage formed by casting within the body 3 of the differential case 2 using a lost foam casting process. It will be appreciated by those skilled in the art that the lubrication passage 32 may be formed by any other appropriate manner known in the art, such as drilling. The lubrication passage 32 is adapted to supply lubricating oil to the pinion seat surface 16 where the pinion mate gear 22 rests during the operation of the differential assembly.

Figure 5:
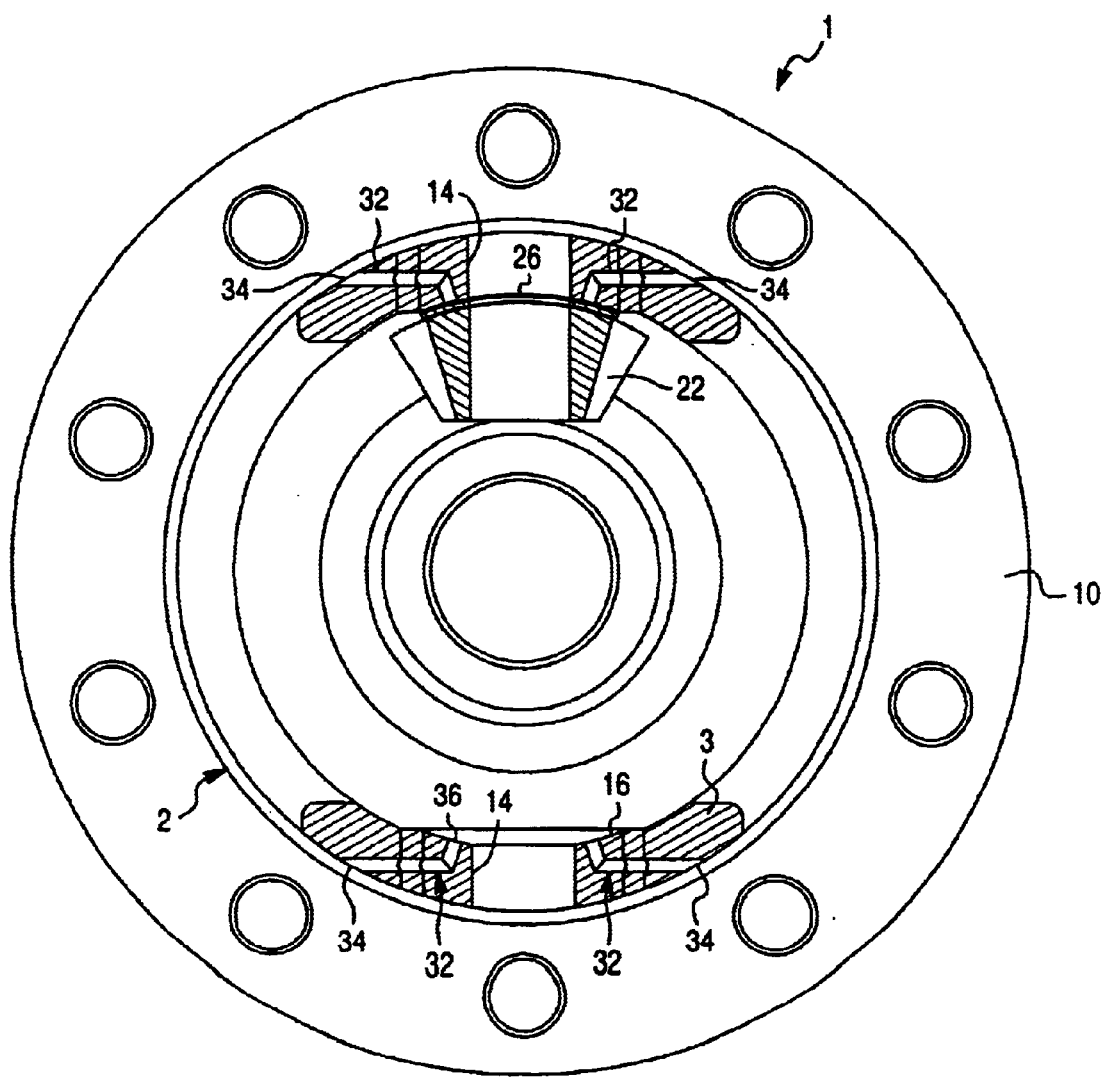
FIG. 5 is a partial cross-sectional view of the differential assembly in accordance with the present invention in a plane perpendicular to a longitudinal axis thereof.
Figure 6:
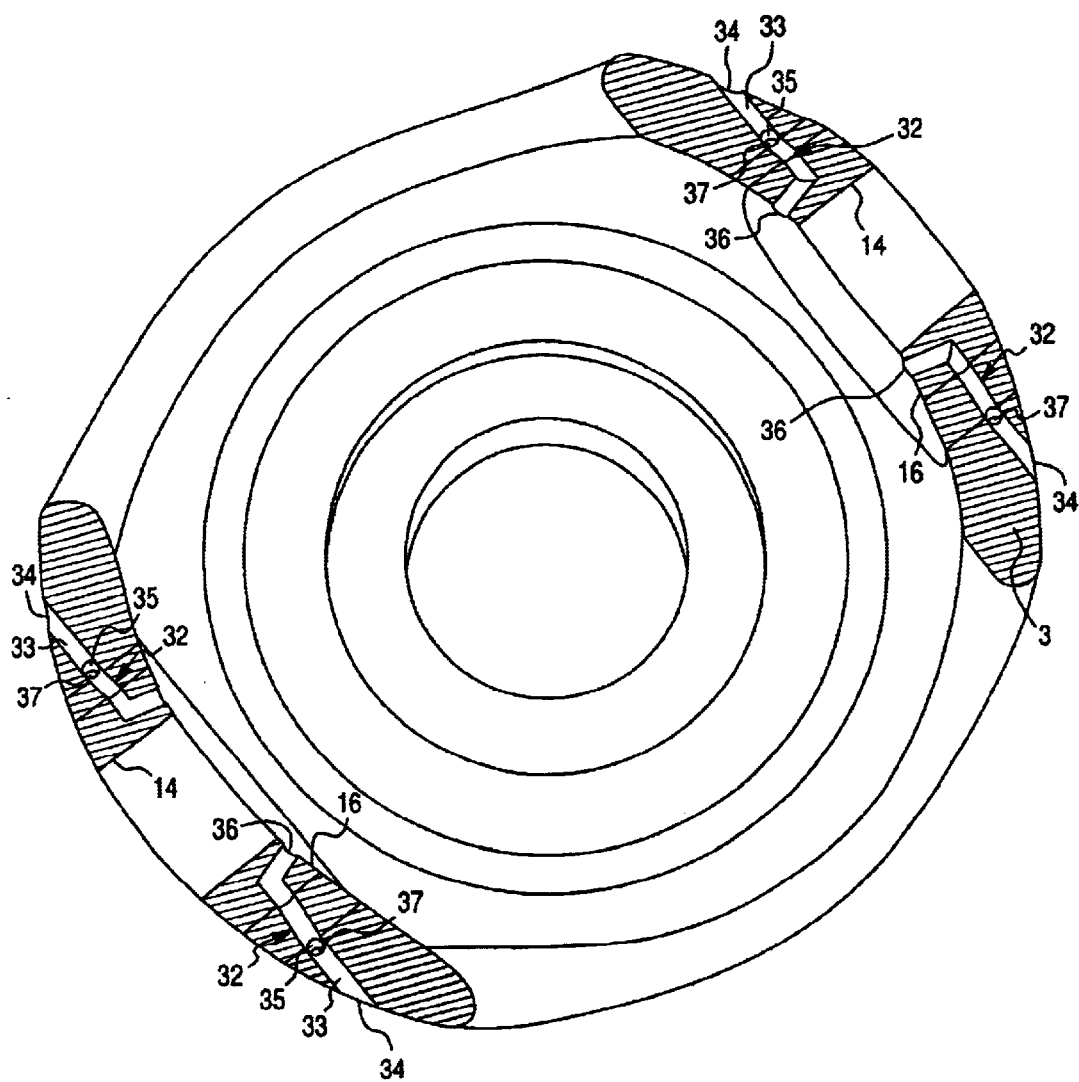
FIG. 6 is a partial perspective view of the differential case in accordance with the present invention.
Figure 7:
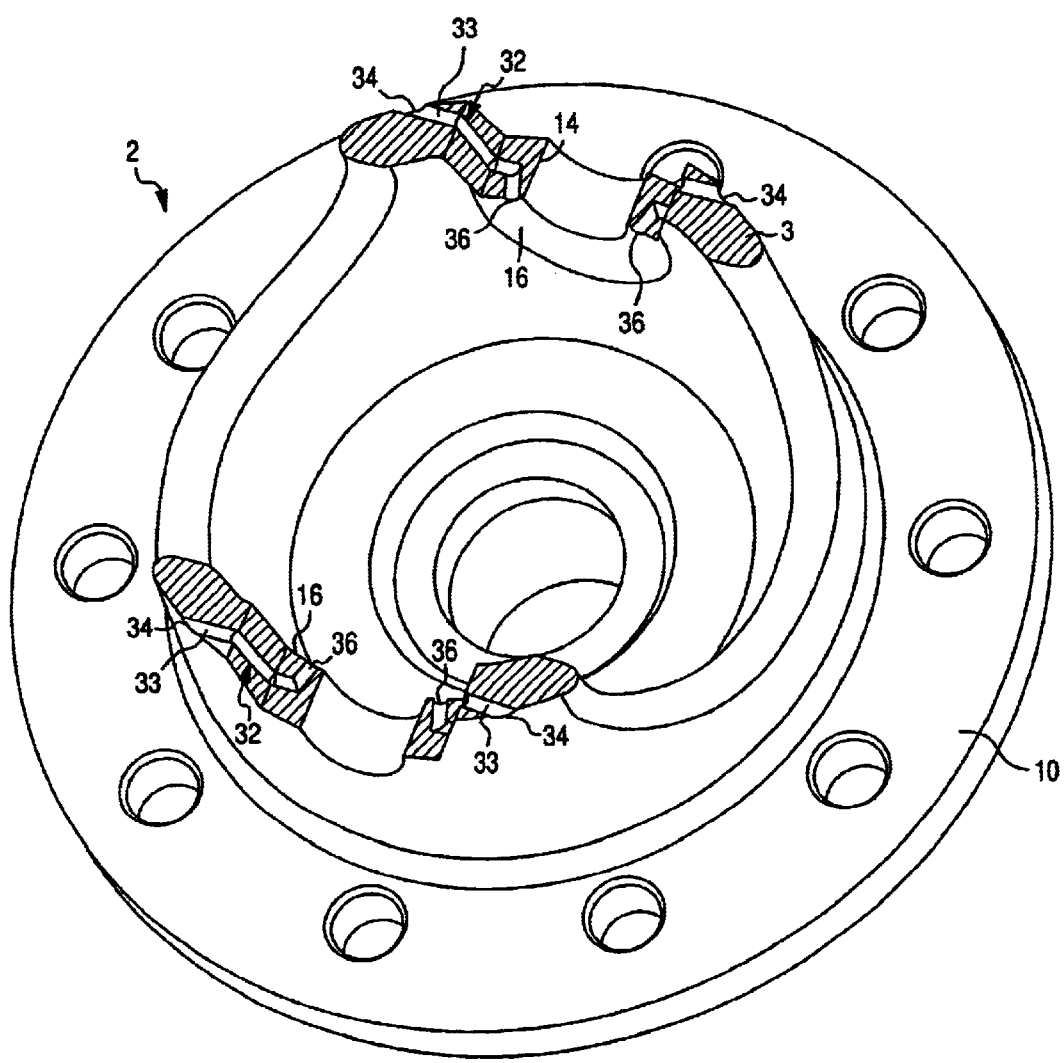
FIG. 7 is a partial perspective view of the differential case in accordance with the present invention in the direction opposite to the view of FIG. 6.

In accordance with the preferred embodiment of the present invention, as illustrated in FIGS. 5–7, a pair of diametrically opposed lubrication passages 32 extending within the body 3 of the differential case 2 from the outer peripheral surface 6 to the inner peripheral surface 8 thereof, is provided adjacent to each of the radial bores 14. It will be appreciated by those skilled in the art that any appropriate number of the lubrication passages provided within the differential case 2 adjacent to each of the radial bores 14, such as three or four, is within the scope of the present invention.

As illustrated in FIGS. 5–7, each of the lubrication passages 32 has at least one inlet port and an outlet port 36. Preferably, as illustrated in FIGS. 2 and 6, each of the lubrication passages 32 is provided with two inlet ports: a first inlet port 34 and a second inlet port 37. The first inlet port 34 is located at a distal end of a first inlet portion 33 of the lubrication passage 32, while the second inlet port 37 is located at a distal end of a second inlet portion 35 of the lubrication passage 32. Preferably, the first inlet portion 33 is oriented in the direction substantially perpendicular to the longitudinal axis 5, while the second inlet portion 35 is oriented in the direction substantially parallel to the longitudinal axis 5. The inlet ports 34 and 37 are open to the outer peripheral surface 6 of the differential case 2 and are spaced from the radial bore 14. Respectively, the outlet port 36 is open to the pinion seat surface 16 in the inner peripheral surface 8 of the differential case 2 and is spaced from the radial bore 14.

Alternatively, each of the lubrication passages 32 may have one inlet port 34 located at a distal end of the inlet portion 33 of the lubrication passage 32 which is oriented in the direction substantially perpendicular to the longitudinal axis 5.

It will be appreciated by those skilled in the art that the lubrication passages 32 may be arranged in many different configuration depending on the geometry of the differential case as long as they provide a communication path for the lubricating oil from the oil reservoir outside the differential case to a space between the pinion seat surface 16 of the differential case and the thrust washer 26.

It is well known to those skilled in the art that the lubricating oil is provided in the central cavity of the axle housing to provide the oil reservoir surrounding the differential assembly. When the differential assembly 1 is operating, the differential case 2 rotates inside the axle housing partially submerged in the lubricating oil so that the lubricating oil is forced into the lubrication passages 32 through the inlet ports 34 and 37. The lubricating oil is then forced along the lubrication passages 32 until it is deposited between the pinion seat surface 16 of the differential case and the thrust washer 26 of the pinion mate gear 22, thereby providing lubrication at this critical location and improved cooling of the differential mechanism.

Therefore, the differential assembly in accordance with the present invention includes a novel arrangement of the differential case having lubrication passages formed within the differential case providing communication paths for the lubricating oil from the oil reservoir outside the differential case to the space between pinion seat surfaces of the differential case and thrust washers of pinion mate gears.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A differential assembly comprising:
   a hollow differential case having at least one substantially radial bore, said differential case provided for rotation about a longitudinal axis;

a differential drive mechanism including at least one pinion mate gear disposed within said differential case and rotatably mounted on a pinion shaft supported in said radial bore;

at least one pinion seat surface formed in said differential case for supporting said pinion mate gear for rotation; and at least one lubrication passage formed in said differential case provided to supply lubricant to a space between said at least one pinion seat surface and said at least one pinion mate gear, said at least one lubrication passage having at least one inlet port provided on an outer peripheral surface of said differential case and spaced from said radial bore, and an outlet port provided on said at least one pinion seat surface and open into said space between said at least one pinion seat surface and said at least one pinion mate gear.

2. The differential assembly as defined in claim 1, wherein said outlet port is spaced from said radial bore in said hollow differential case.

3. The differential assembly as defined in claim 1, further including at least one thrust washer disposed between said at least one pinion seat surface and said at least one pinion mate gear, wherein said outlet port opens into said space between said at least one pinion seat surface and said at least one thrust washer.

4. The differential assembly as defined in claim 1, wherein said at least one lubrication passage includes at least two inlet ports.

5. The differential assembly as defined in claim 1, including at least two lubrication passages formed within said differential case and provided to supply lubricant to said at least one pinion seat surface.

6. The differential assembly as defined in claim 1, wherein said at least one lubrication passage includes at least one inlet portion adjacent to said at least one inlet port; said at least one inlet portion of said at least one lubrication passage is oriented in a direction substantially perpendicular to said longitudinal axis.

7. A differential assembly comprising:

a hollow differential case having two opposite substantially radial bores, said differential case provided for rotation about a longitudinal axis;

a differential drive mechanism including two pinion mate gears disposed within said differential case and rotatably mounted on a pinion shaft supported in said radial bores;

two pinion seat surfaces formed in said differential case about said radial bores for supporting said pinion mate gears for rotation;

two thrust washers each disposed between one of said pinion seat surfaces and one of said pinion mate gears; and two pairs of lubrication passages formed in said differential case for supplying lubricant to spaces between said pinion seat surfaces and said thrust washers, each pair of said lubrication passages is disposed about one of said radial bores;

each of said lubrication passages having two inlet ports provided on an outer peripheral surface of said differential case and spaced from said radial bores and an outlet port open into said space between one of said pinion seat surfaces and corresponding one of said thrust washers and spaced from one of said radial bores;

each of said lubrication passages including two inlet portions adjacent to said inlet ports, one of said inlet portions is oriented in a direction substantially perpendicular to said longitudinal axis.

8. A differential case comprising:

a hollow body defining a cavity and provided for rotation about a longitudinal axis;

at least one substantially radial bore formed in said hollow body;

at least one pinion seat surface formed on an inner peripheral surface of said hollow body adjacent to said at least one radial bore; and at least one lubrication passage formed within said differential case provided to supply lubricant to said at least one pinion seat surface, said at least one lubrication passage having at least one inlet port provided on an outer peripheral surface of said differential case and spaced from said radial bore, and an outlet port provided on said at least one pinion seat surface.

9. The differential case as defined in claim 8, wherein said outlet port is ad spaced from said radial bore in said hollow body of said differential case.

10. The differential case as defined in claim 8, wherein said at least one lubrication passage includes at least two inlet ports.

11. The differential case as defined in claim 8, including at least two lubrication passages formed within said differential case and provided to supply lubricant to said at least one pinion seat surface.

12. The differential case as defined in claim 8, wherein said at least one lubrication passage includes at least one inlet portion adjacent to said at least one inlet port; said at least one inlet portion of said at least one lubrication passage is oriented in a direction substantially perpendicular to said longitudinal axis.

* * * * *